Dec. 26, 1933.  H. C. HANSON ET AL  1,941,301
TRAY HOLDER FOR OVENS
Filed May 19, 1932
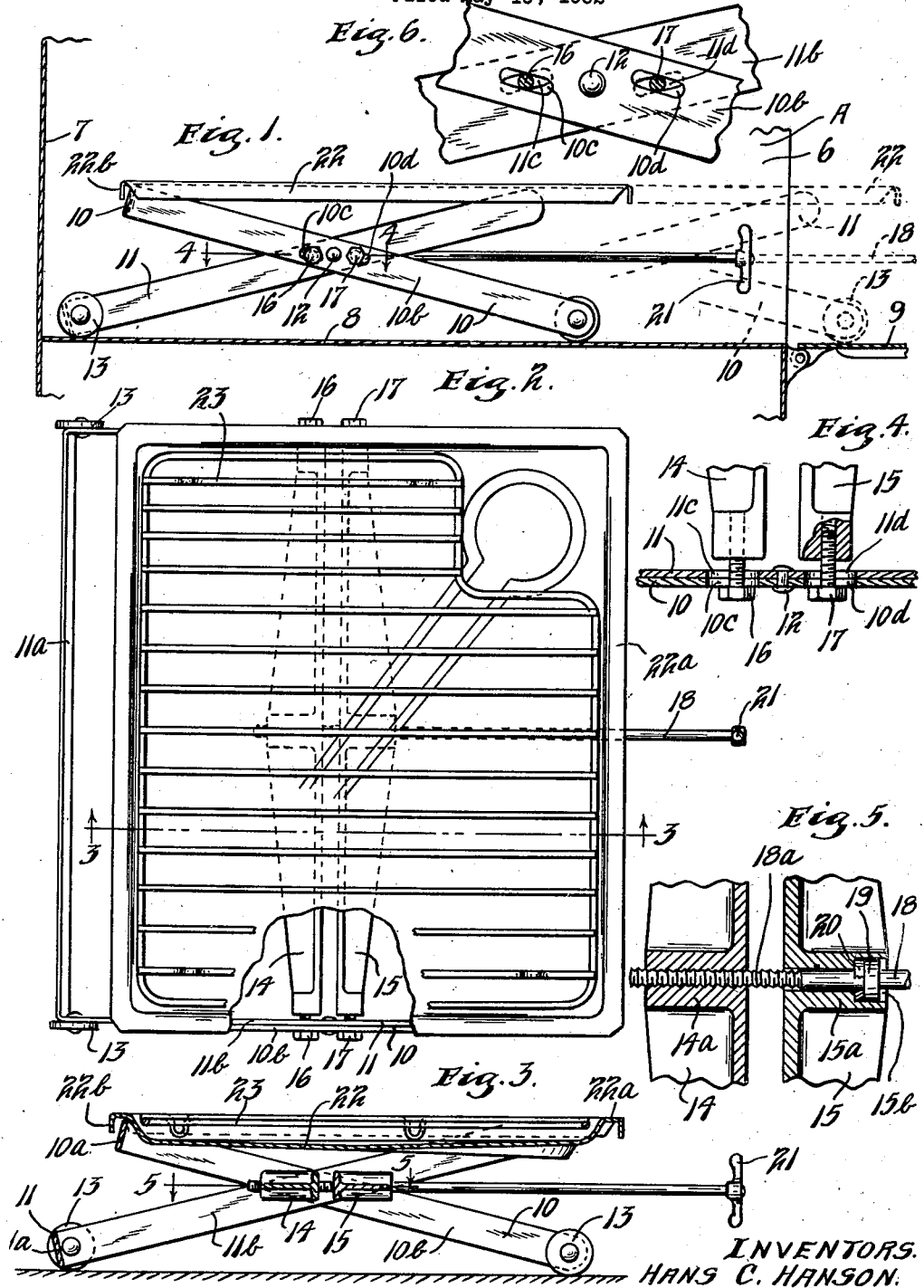
INVENTORS.
HANS C. HANSON.
KENNETH S. JENSON.
BY THEIR ATTORNEYS.
Williamson & Williamson Patented Dec. 26, 1933

1,941,301

UNITED STATES PATENT OFFICE 1,941,301

TRAY HOLDER FOR OVENS

Hans C. Hanson and Kenneth S. Jenson, Albert Lea, Minn., assignors to American Gas Machine Company, Albert Lea, Minn., a corporation of Delaware Application May 19, 1932. Serial No. 612,292

1 Claim. (Cl. 254—122)

This invention relates to extensible holders for supporting trays in stove ovens and for kindred uses.

It is the general object of the invention to provide a novel and improved extensible support particularly adapted for use in holding trays in stove ovens which support is of cheap and simple construction and can be conveniently operated to permit withdrawal of a tray from an oven and can also be readily operated to permit the tray to be raised or lowered to any desired height in the oven and which when lowered to its lowermost position will take up but small space in the oven.

The objects and advantages of the present invention will more fully appear from the following description, made in connection with the accompanying drawing, wherein like reference characters refer to the same or similar parts throughout the various views, and, in which, Fig. 1 is a vertical section taken through a portion of a stove oven wherein a tray support embodying the invention is illustrated, the support being shown in one position in full lines and in another position in dotted lines;

Fig. 2 is a plan view of the tray support and tray carried thereby;

Fig. 3 is a vertical section taken on the line 3—3 of Fig. 2, as indicated by the arrows;

Fig. 4 is a horizontal section taken on the line 4—4 of Fig. 1, as indicated by the arrows;

Fig. 5 is a horizontal section taken on the line 5—5 of Fig. 3, as indicated by the arrows; and Fig. 6 is a detailed view illustrating certain of the parts as shown in Fig. 1, on enlarged scale.

Referring to the drawing, there are illustrated portions of the oven A of an ordinary stove. This oven includes a chamber having side walls 6, back wall 7, bottom wall 8 and a front door 9 hinged to the front portion of the oven for downward swinging movement. This door preferably will be arranged so that when downwardly swung as shown in Fig. 1, it will lie approximately flush with the bottom 8 of the oven.

The tray holder made in accordance with the invention includes a U-shaped bar 10 having a central connecting portion 10a and arms 10b. There is also provided a second U-shaped bar 11 having a central connecting portion 11a and arms 11b. The arms 10b and 11b are respectively pivotally connected together by means of pivots 12 and these arms, accordingly, form pairs of toggle levers. The free ends of the arms 11b are upwardly disposed while the free ends of the arms 10b are downwardly disposed. Pivotally connected to the lower ends of the arms 10b and 11b are rollers 13. A pair of oppositely facing bars 14 and 15 respectively extend between the two arms 11b and mounted in the ends of the bar 14 are a pair of bolts 16 which project through slots 11c in the arms 11b and through slots 10c in the arms 10b. Secured to the ends of the bar 15 are a pair of bolts 17 which project through slots 11d in the arms 11b and through slots 10d in the arms 10b. The slots 10c and 10d run parallel to the edges of arms 10b but slots 10c are spaced from the pivots 12 toward the lower edges of the arms 10b, while the slots 10d are spaced from the pivots 12 toward the upper edges of the arms. The slots 11c and 11d similarly run parallel to the edges of the arms 11b but the slots 11c are spaced from the pivots 12 toward the upper edges of the arms 11b, while the slots 11d are spaced from the pivots 12 toward the lower edges of the arms 11b. By reason of this construction of the various slots in the arms, it will be seen that movement of the two bars 14 and 15 toward each other will cause extension of the toggle levers formed by the arms, while movement of the two bars 14 and 15 away from each other will cause distension of the toggle levers. The bars 14 and 15 are quite heavy in construction and the two bars have oppositely disposed apertured hubs 14a and 15a respectively. The hub 14a is screw threaded to receive the screw threaded portion 18a of an operating rod 18, while the hub 15 is smooth bored to permit free rotation of the rod 18 which projects therethrough. The outer end of the hub 15a is provided with a recess 15b within which fits flange 19 formed integral with or secured to the rod 18. Flange 19 bears against a washer 20 also located within the recess 15b. The outer end of the rod 18 is equipped with a handle 21.

Although it is possible to support trays of different types upon the tray support, there is illustrated a tray 22 of special construction for use with the particular support of the invention. This tray 22 is of rectangular shape and has the usual dished portion upon which a suitable grill 23 may rest and the tray at its top is provided with a border 22a from which downwardly extending flanges 22b project. The spacing between the two ends of the tray is such that the upper ends of the arms 11b and the upper ends of the arms 10b may be received within the channels formed by the ends of the dish-shaped portion, the end border portions 22a and the end flanges 22b of the tray, while the upper edge of the connecting portion 10a may be received within the channel formed by the rear of the dish-shaped portion, the rear border portion 22a and the rear flange 22b of the tray.

In use, the tray 22 will be located as shown to rest on the intermediate portion 10a and the upper ends of the arms 10b and 11b. Whatever food is to be cooked may be supported by the tray 22 or the grill 23 thereon. If it is desired to elevate the tray to a higher level in the oven, so that the food being cooked may be located farther from the bottom 8 of the oven, this may be readily done by merely turning the handle 21 in a clockwise direction. The rod 18, as it is turned in this manner, will draw the bar 15 more closely toward the bar 14 and as a result, the pairs of toggle levers formed by the respective adjacent arms 10b and 11b will be extended to raise the upper ends of these arms and the tray 22. If it is desired to lower the position of the tray in the oven, it is only necessary to turn the handle 21 in a counter clockwise direction, whereupon the force of gravity causes the two bars 14 and 15 to spread apart, permitting lowering of the toggle levers and the tray carried thereby. If it is desired to withdraw the food from the oven as for basting or the like, it is only necessary for the cook to open the oven door 9, grasp the handle 21 and draw the support outwardly onto the oven door 9 from the full line position shown in Fig. 1 to the dotted line position there shown. The rollers 13 readily permit this movement. It will also be seen that the tray 22 can be located in any desired position relative to the back of the oven in similar manner. It should be noted that as the tray is raised or lowered, the rear portion of the tray will retain its position relative to the connecting portion 10a of the bar 10, while the upper ends of the arms 11b will slide forwardly and rearwardly in the channels provided therefor.

The present device is quite cheap and simple in construction and it is easy to operate. Although the device is particularly adapted for use in connection with a tray support for stove ovens, it will be understood that it may be used in other relations. The device has been amply and successfully demonstrated in actual practice. When lowered to its extreme position, it takes up but small space in the oven.

It will, of course, be understood that various changes may be made in the form, details, arrangement and proportions of the various parts without departure from the scope of the present invention, which, generally stated, consists in the matter shown and described and set forth in the appended claim.

What is claimed is:—

A tray support for ovens and the like, comprising a U-shaped member having spaced arms and a connecting portion, a second U-shaped member having spaced arms and a connecting portion, pivots interconnecting the medial portions of first and second mentioned arms, a pair of spaced bars running between the medial portions of said first mentioned arms, said first mentioned arms having a pair of slots therein respectively disposed at opposite sides of said pivots and running parallel to said arms, said second mentioned arms also each having a pair of slots therein respectively disposed at opposite sides of said pivots and running parallel to said arms, said bars having end extensions, each of which runs through one slot of one of said first mentioned arms and one slot of one of said second mentioned arms, and means for varying the spacing between said bars.

HANS C. HANSON.
KENNETH S. JENSON.